Figure 4:
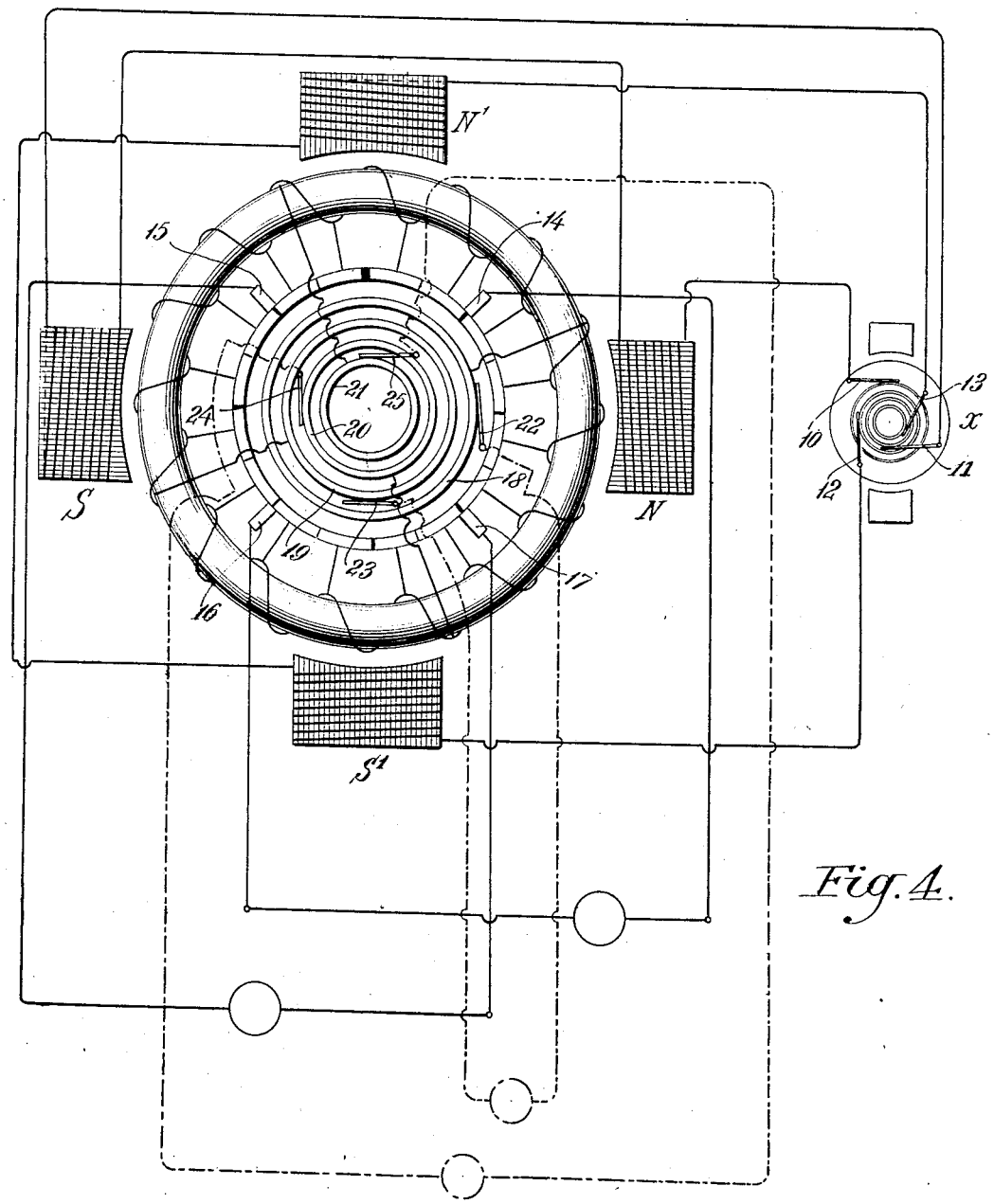

No. 816,192. PATENTED MAR. 27, 1906.
W. STANLEY.
ELECTRICAL GENERATOR.
APPLICATION FILED FEB. 17, 1904. RENEWED NOV. 11, 1904.
4 SHEETS—SHEET 1.
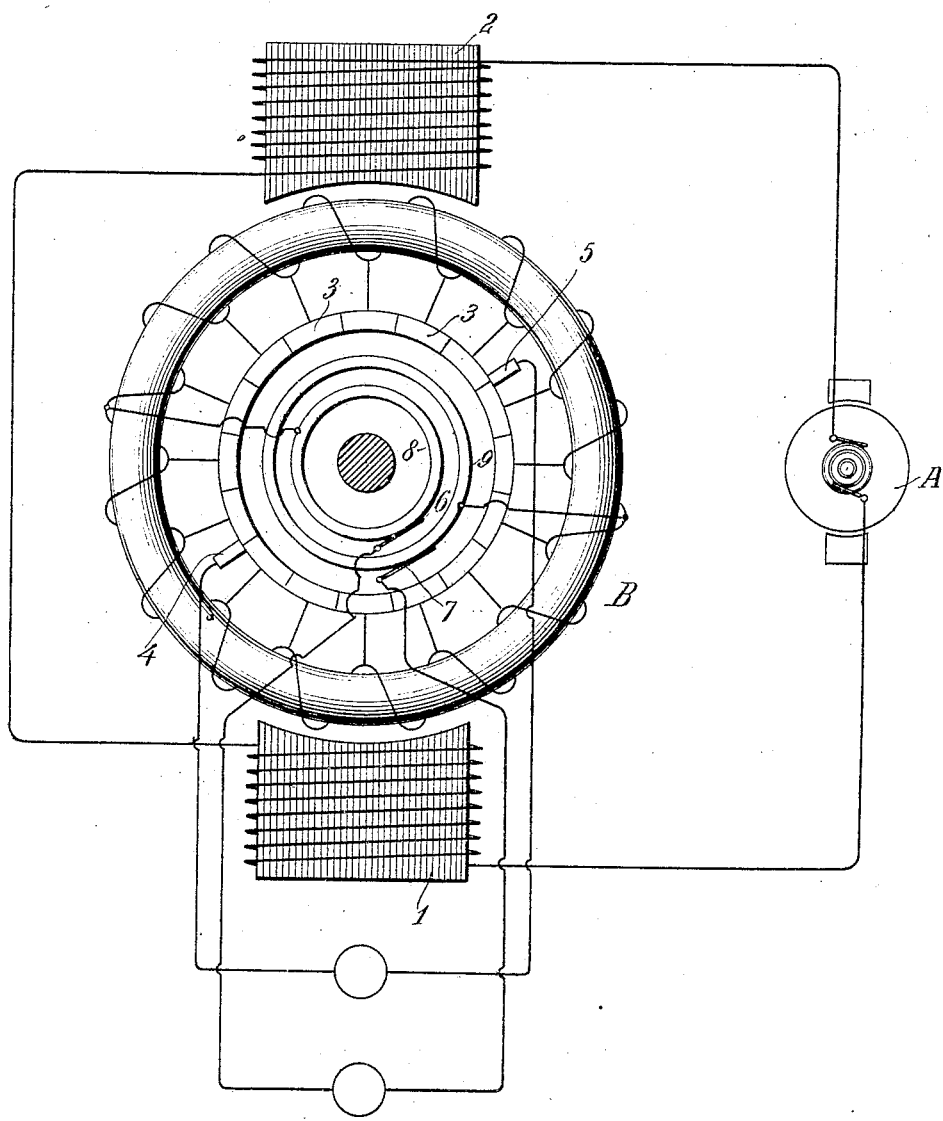
Fig: 1
Witnesses
John O. Gempler.
Geo. M. Harris.
William Stanley
Inventor
By his Attorneys Kenyon & Kenyon No. 816,192. PATENTED MAR. 27, 1906.
W. STANLEY.
ELECTRICAL GENERATOR.
APPLICATION FILED FEB. 17, 1904. RENEWED NOV. 11, 1904.
4 SHEETS—SHEET 2.
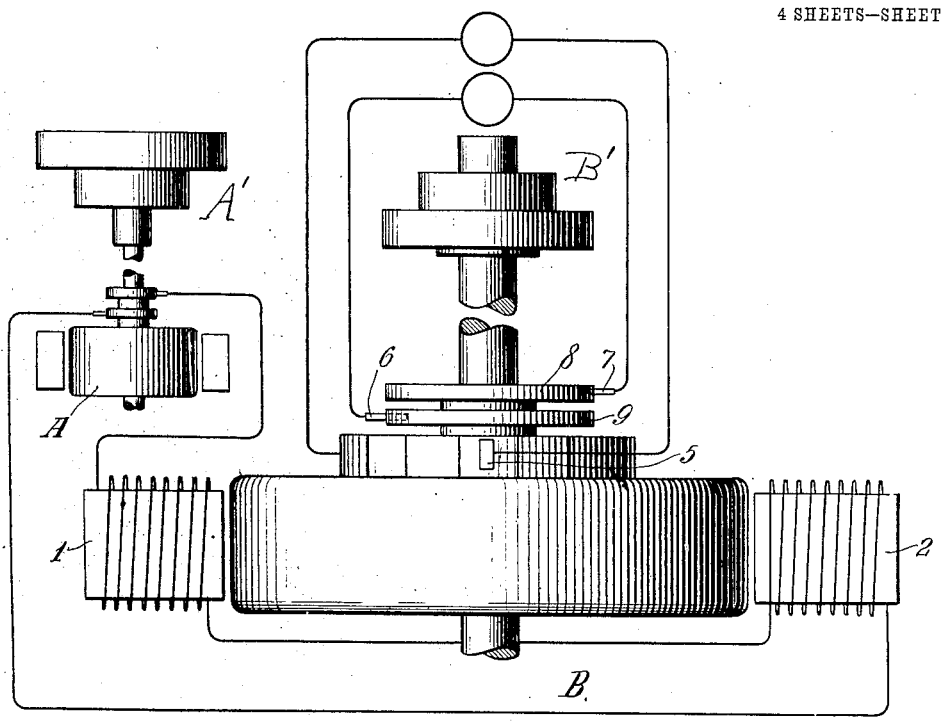
Fig: 2
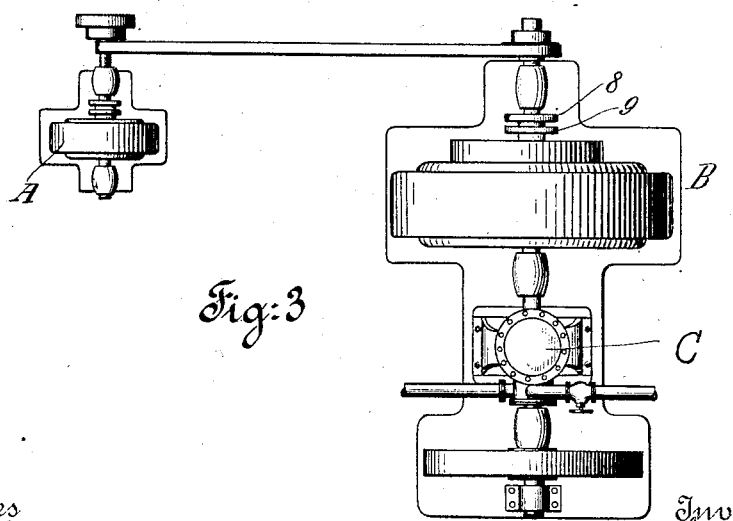
Fig: 3
Witnesses
John O. Gempler.
Geo. M. Harris.
Inventor
William Stanley
By his Attorneys
Kenyon & Kenyon No. 816,192.  
PATENTED MAR. 27, 1906.

W. STANLEY.  
ELECTRICAL GENERATOR.  
APPLICATION FILED FEB. 17, 1904. RENEWED NOV. 11, 1904.

4 SHEETS—SHEET 3.

Witnesses  
John O. Gempler.  
Geo. M. Harris.

William Stanley  
Inventor  
By his Attorneys Kenyon & Kenyon

No. 816,192. PATENTED MAR. 27, 1906.
W. STANLEY.
ELECTRICAL GENERATOR.
APPLICATION FILED FEB. 17, 1904. RENEWED NOV. 11, 1904.
4 SHEETS—SHEET 4.
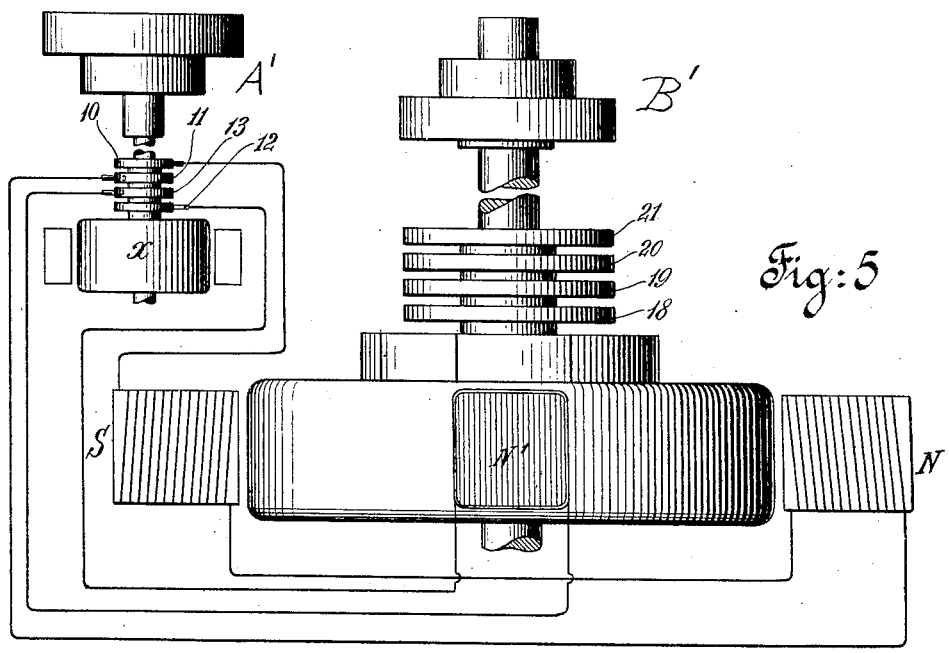
Fig: 5
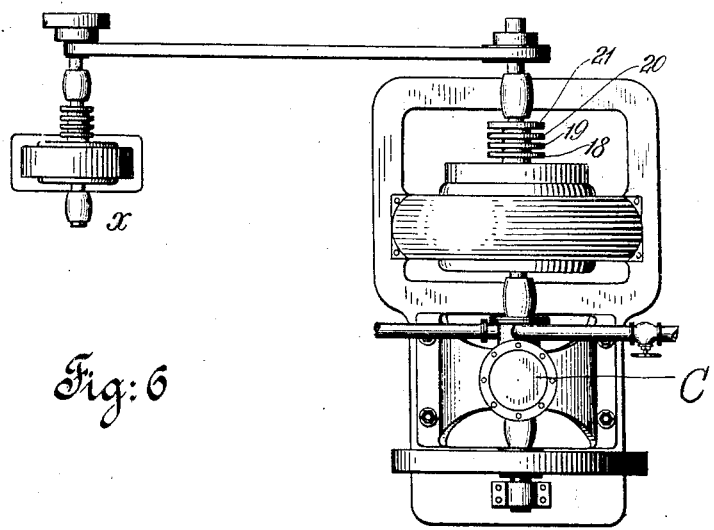
Fig: 6
Witnesses
John O. Templer
Geo. M. Harris
Inventor
William Stanley
By his Attorneys Kenyon & Kenyon

UNITED STATES PATENT OFFICE.

WILLIAM STANLEY, OF GREAT BARRINGTON, MASSACHUSETTS.

ELECTRICAL GENERATOR.

No. 816,192.     Specification of Letters Patent.     Patented March 27, 1906.

Application filed February 17, 1904. Renewed November 11, 1904. Serial No. 232,294.

*To all whom it may concern:*

Be it known that I, WILLIAM STANLEY, a citizen of the United States, residing in Great Barrington, county of Berkshire, and State of Massachusetts, have invented new and useful Improvements for Electrical Generators, of which the following is a specification.

My invention relates to electrical generators, and has for its object to produce, by means of an electrical generator, alternating currents differing in frequency from one another.

A further object of the invention is, by means of an induced member and of a suitably-excited inducing member, one of said members being driven, to generate in the induced member alternating currents of frequencies differing from one another, one of these frequencies being independent of the speed of the driven member.

A further object of the invention is to enable one to vary the frequency of an alternating current at will.

The currents derived from my generator are particularly desirable for the operation of alternate-current motors for the purpose of varying the speed of such motors.

In carrying out my invention I may employ apparatus to produce either single or multiphase currents of different frequencies, and I make use of two-pole or multipolar machines, and the inducing member or the induced member may be rotor or stator, respectively.

With the above and other objects in view my invention consists in the parts, improvements, and combinations more fully set out in the claims.

Referring to the accompanying drawings attached to this specification and forming a part hereof, Figure 1 illustrates a simple form of the device for generating alternate currents of two frequencies. Fig. 2 shows a plan view of the form of machine illustrated diagrammatically in Fig. 1. Fig. 3 shows the means for driving the generator and frequency-setter. Fig. 4 shows the application of my invention to a multiphase system. Fig. 5 illustrates a plan view of the apparatus of Fig. 4. Fig. 6 illustrates the means for driving the exciter shown in Fig. 5.

A represents a source of alternating currents, such as a small alternator, giving alternating currents of a frequency of, say, two periods per second. Any suitable means may be used to vary the frequency of the currents supplied by A. In the embodiment of the invention illustrated in the drawings I have shown a variable-speed mechanism for driving the generator A, such as a system of stepped pulleys A' B', which serves to vary the frequency. The form of the inducing member of the generator B may be widely varied. In the embodiment of my invention illustrated in Fig. 1 the inducing member consists of two field-magnets 1 and 2, the coils of which are wound upon laminated cores of magnetic material. These coils are supplied with current from the frequency-setter A.

The induced member, which in the present instance is the rotor, may be wound in any desired manner. I have shown a conventional form of ring-winding, the coils of which are individually connected to the sections 3 of a commutator of the direct-current type. 4 and 5 are brushes conducting alternating currents from the rotor-winding through the commutator.

Any desired means may be provided for driving the generator B. I have shown for this purpose a direct connected steam-engine C, mounted upon the shaft of the rotor. The generator B is provided with brushes 6 and 7 and leads conducting current from the same rotor-winding by means of slip-rings 8 and 9. A separate rotor-winding might be used for each set of currents—one winding for the commutator-current and the other for the slip-ring current. If now the rotor be revolved when the field-magnets 1 and 2 are magnetized by the alternate currents from A, then the brushes 4 and 5 will receive alternate currents of frequency equal to the frequency of A, this frequency being, say, two periods per second and of an electromotive force proportional to the speed of rotation of the rotor. The frequency of these currents is independent of the speed of rotation of the rotor. The brushes 6 and 7 and leads will receive current of a frequency depending upon the frequency of rotation of the rotor. The electromotive force of the slip-ring currents at any instant depends upon the intensity of the magnetic-field at that instant. This field depends upon the current supplied to the field-magnets of B, which is constantly varying in strength. For example, if the generator be a two-pole machine and if the frequency of the excitation-current be two periods per second and the rotation of the rotor be six hundred revolutions per minute, the frequency of the currents derived from the commutator-brushes 4 and 5 will be two periods per second, and the frequency of the currents from the slip-rings 6 and 7 will be ten periods per second. The amplitudes of successive waves of the slip-ring current will not be equal. By varying the frequency of excitation and the speed of rotation of the rotor in the form of the invention shown on the drawings the frequencies of the currents derived from the generator may be varied and the frequency of the commutator-current be kept low.

In carrying out my invention for multiphase currents I construct a generator with phase-differing fields—that is to say, fields excited by phase-differing currents, such as two-phase currents. Figs. 4, 5, and 6 represent such a generator diagrammatically and the connections to the multiphase-frequency setter X. 10, 11, 12, and 13 are the multiphase-brushes and leads from the frequency-setter X, energizing the four-pole generator-field, the current from leads 10 and 11 magnetizing the fields N S and the leads 12 and 13 magnetizing the poles N' S'. The rotor of the generator may be wound in any desired manner. In the embodiment of the invention illustrated upon the drawings it is wound with a closed circuited winding and is provided with a commutator comprising a plurality of sections and having four sets of brushes located about the commutator to receive current from the rotor-winding. These brushes and leads will be seen at 14, 15, 16, and 17. Rings 18, 19, 20, and 21 are provided and are connected by conductors to four equidistant parts of the rotor-winding and furnish currents to the brushes 22, 23, 24, and 25. It is evident from the above that the current in the circuit 14 16 will differ in phase from the current in 15 17, since the currents are generated by phase-differing fields; also, that the currents received by 22, 23, 24, and 25 will differ from one another in phase for the same reason. Now consider that the direction of rotation of the rotor is the same as the direction of electromagnetic rotation of the fields N S N' S' and that these fields are excited by two currents of a frequency which equals two periods per second, while the rotation of the rotor is equal to six hundred revolutions per minute. The frequency of the currents taken from the commutator will be two periods per second, and the frequency of the current taken from the slip-rings 22, 23, 24, and 25 will be ten periods per second minus two periods per second, which equal eight periods per second. The commutated currents will differ in phase by ninety degrees from each other, as will also the slip-ring currents. For multipolar armature connections equidistant potential differing coils are connected in the usual manner.

I may generate three-phase currents instead of two-phase currents by tapping the induced member at three equidistant points and connecting these points with the lines by means of slip-rings, if desired.

The operation of my generators will be readily understood. By driving the generator and suitably exciting it from the exciter alternating currents differing in frequency are obtained, which currents may be used separately or combined for any desired purpose. In general, any form of winding employed for generating continuous and alternating currents from the same armature when the fields are energized by steady or continuous currents may be employed to produce currents which differ in frequency when the fields are energized by alternate currents, as described above.

My invention is not limited to the specific forms of the invention illustrated or described by me, since many changes may be made without departing from the spirit of the invention.

What I claim as new, and desire to secure by Letters Patent, is—

1. In an electrical generator, the combination of an inducing member, an induced member, means for driving one of said members at a predetermined speed, means for deriving from said induced member alternating current having a frequency independent of the speed, and means for deriving from said induced member alternating current dependent upon said predetermined speed having a frequency different from that of the first-named current, substantially as described.

2. In an electrical generator, the combination of a rotor, a stator, means for supplying the stator with alternating current of a predetermined frequency, and means for deriving from the rotor alternating currents differing in frequency from one another, substantially as described.

3. In an electrical generator, the combination of means for producing a plurality of magnetic fields differing in phase, an induced member, and means for deriving from said induced member alternating currents differing in frequency from one another, substantially as described.

4. In an electrical generator, the combination of an inducing member, means for producing a plurality of magnetic fields differing in phase, an induced member, means for driving one of said members and means for deriving from said induced member alternating currents differing in frequency from one another, substantially as described.

5. In an electrical generator, the combination of means for producing an electromagnetic rotation of an inducing-field, an induced member and means for deriving from said induced member alternating currents differing in frequency from one another, substantially as described.

6. In an electrical generator, the combination of a rotor, a stator, means for supplying the stator with a plurality of alternating currents of a predetermined frequency, and means for deriving from the rotor alternating currents differing in frequency from one another, substantially as described.

7. In an electrical generator, the combination of a plurality of pairs of electromagnets forming the stator, means for exciting each pair of electromagnets with alternating currents of a predetermined frequency, the current supplying one pair being out of phase with respect to the current supplying another pair, a rotor, means for driving said rotor, and means for deriving from said rotor alternating currents differing in frequency from one another, substantially at described.

8. In an electrical generator, the combination of a plurality of pairs of electromagnets forming the stator, means for exciting said pairs of electromagnets respectively with out-of-phase alternating currents, a rotor, said rotor being provided with means for driving it, a commutator comprising a plurality of sections, connections between the rotor and the sections of the commutator, slip-rings, and suitable connections between potential-differing coils of the rotor and the slip-rings, substantially as described.

9. In an electrical generator, the combination of a plurality of pairs of electromagnets forming the stator, means for exciting said pairs of electromagnets respectively with out-of-phase alternating currents, a rotor comprising a plurality of coils, said rotor being provided with means provided for driving it, a commutator comprising a plurality of sections, connections between the coils and said sections, slip-rings, and suitable connections between potential-differing coils on said rotor and said slip-rings, substantially as described.

10. In an electrical generator, the combination of a plurality of pairs of electromagnets forming the inducing member, means for exciting said pairs of electromagnets respectively with out-of-phase alternating currents, an induced member comprising a plurality of coils, one of said members being adapted to be driven, a commutator comprising a plurality of sections, connections between the coils and said sections, slip-rings, suitable connections between potential-differing coils on said induced member and said slip-rings, and means for driving one of said members at a speed different from that of the electromagnetic rotation of the fields produced by said out-of-phase currents, substantially as described.

11. In an electrical generator, the combination of a plurality of pairs of electromagnets forming the stator, means for exciting said pairs of electromagnets respectively with out-of-phase alternating currents, a rotor comprising a plurality of coils, said rotor being adapted to be driven, a commutator comprising a plurality of sections, connections between the coils and said sections, slip-rings, suitable connections between potential-differing coils on said rotor and said slip-rings, and means for driving said rotor at a speed different from that of the electromagnetic rotation of the fields produced by said out-of-phase currents, substantially as described.

12. In an electrical generator, the combination of an inducing member, an induced member, means for driving one of the said members at a predetermined speed, a plurality of sets of brushes fixed relatively to said inducing member and means for causing said induced member to impress upon said sets of brushes respectively alternating currents differing in frequency, substantially as described.

13. In an electrical generator, the combination of an inducing member, an induced member, means for driving one of said members at a predetermined speed, a plurality of sets of brushes fixed relatively to said inducing member, means for causing said induced member to impress upon one of the said sets of fixed brushes a frequency independent of the speed and means for causing said induced member to impress upon the other set of fixed brushes a different frequency dependent upon the speed, substantially as described.

14. In an electrical generator, the combination of an inducing member, an induced member, a commutator and collecting-rings connected to said induced member, sets of brushes fixed relatively to said inducing member for said commutator and collecting-rings respectively and means for energizing the inducing member by alternating currents of a predetermined frequency.

15. In an electrical generator, the combination of an inducing member, an induced member, a commutator and collecting-rings connected to said induced member, sets of brushes fixed relatively to said inducing member for said commutator and collecting-rings respectively and means for energizing the inducing member by a plurality of multiphase alternating currents of predetermined frequency.

In testimony whereof I have signed my name to this specification in the presence of two subscribing witnesses.

WILLIAM STANLEY.

Witnesses:
EDWIN SEGER,
JOHN O. GEMPLER.